June 13, 1967  L. E. LANCY  3,325,008
METAL WASTE SOLUTION SLUDGE REMOVAL
Filed Oct. 2, 1964  2 Sheets-Sheet 2

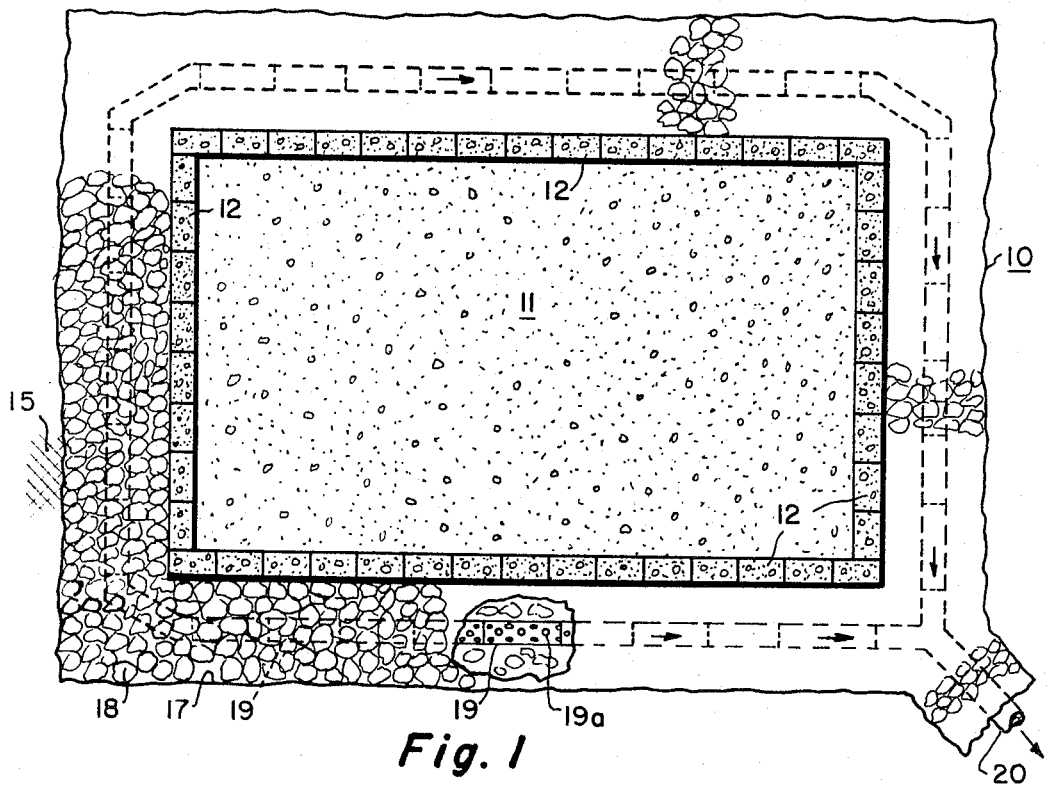
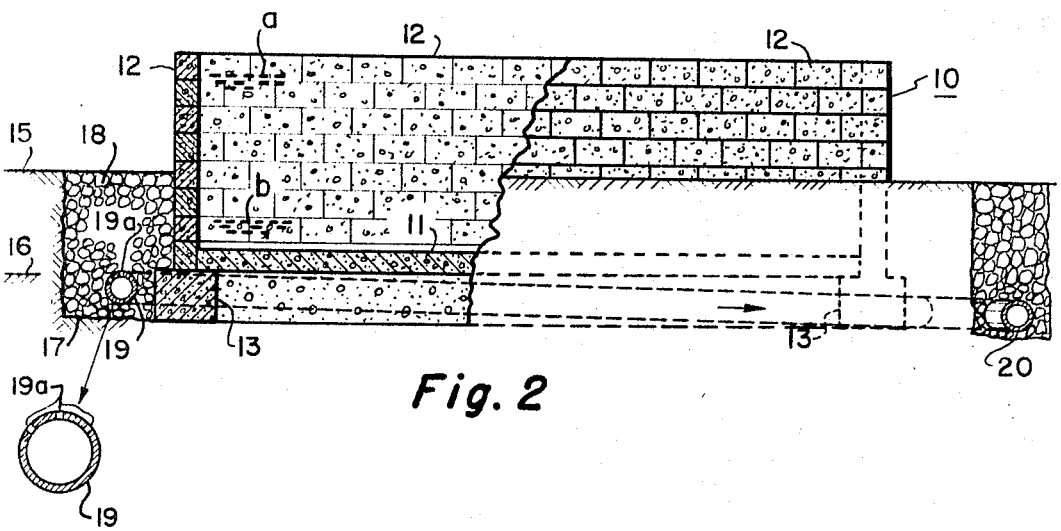

INVENTOR.
Leslie E. Lancy
BY Green, McCallister & Miller
HIS ATTORNEYS though their top surfaces are dried, the water content of the sludge in a lagoon will be nearly the same as when the used or waste treating processing solutions were discharged therein years earlier. Seepage through the ground is not practical, since the pores of the ground will soon be plugged by the particles of the precipitates that settled in the voids through which the water is to travel.

United States Patent Office 3,325,008
Patented June 13, 1967

3,325,008
METAL WASTE SOLUTION SLUDGE REMOVAL
Leslie E. Lancy, Country Club Drive,
Ellwood City, Pa. 16117
Filed Oct. 2, 1964, Ser. No. 401,012
16 Claims. (Cl. 210—73)

ABSTRACT OF THE DISCLOSURE

A process and apparatus for removing sludge and sludge precipitates or floc from solutions such as used in acid pickling, plating, etc. Use is made of substantially impervious bed for collecting the sludge and a porous or permeable vertical or surrounding side wall by which the liquid or water content of the sludge is removed by capillary action and sidewise seeping-out movement therethrough. Water or liquid which passes through the side wall is collected in a surrounding moat, passed through a filtering aggregate in the moat and moved from a position below the side wall and the bed for suitable disposal.

---

This invention relates to removing or collecting slimy precipitate sludge from waste aqueous or liquid processing solutions, and particularly, to separating out the sludge from the water or liquid content of used metal treating or finishing solutions.

A phase of the invention pertains to de-watering or drying and collecting metal compounds that are present in the form of precipitates in used or spent metal treating or finishing solutions.

Solutions that have been used for the treatment of metals and their surfaces which are termed process solutions may result from acid pickling, plating, etc. The metals that are dissolved in such solutions are usually precipitated in the form of metal compounds or hydroxides, such as iron hydroxides, $Fe(OH)_2$, $Fe(OH)_3$, copper hydroxide, $Cu(OH)_2$, chromium hydroxide, $Cr(OH)_3$, carbonates, and other insolubles. These metal compounds are precipitated from rinse water on neutralization or from various concentrated process solutions in the form of sludge. The sludge is usually in the form of a light floc that compacts slowly, but even when compacted, only has about 1% dry weight with the remainder of the sludge weight being water or liquid. When the sludge is separated from the water and moved through piping, the pumped liquid has a dry weight that is only a fraction of 1%.

The separation of the water and the drying of sludge is a highly important operation and in many cases the most costly part of a metal finishing waste treatment. This is due to the fact that the precipitated metal hydroxides, carbonates and other insoluble forms in which the metals are separated from the water wastes, all lead to slimy precipitates that are extremely difficult to dry or de-water. The usual methods of de-watering in industry, such as centrifuging, pressure or vacuum filtration, have not been successful.

The generally accepted method of water removal as to sludges is to filter downwardly through a porous bed, using large quantities of filter acid or inert materials that have a porous structure. However, there is a serious tendency of the metal compounds, such as the hydroxides, to block the removal of the liquid by quickly plugging up the open pores through the filter aid material. As a result, this method is an expensive addition to metal finishing waste treatment costs.

Another method has been to collect the precipitated metal salts in sludge lagoons. However, when these lagoons are filled up, the problem of dewatering again has to be faced. Since metal hydroxides and carbonate precipitates are hygroscopic, they hold water. Even when their top surfaces are dried, the water content of the sludge in a lagoon will be nearly the same as when the used or waste treating processing solutions were discharged therein years earlier. Seepage through the ground is not practical, since the pores of the ground will soon be plugged by the particles of the precipitates that settled in the voids through which the water is to travel.

I have determined that the complete drying of such sludges is not necessary, in that the precipitated metal salts that are the usual end products of neutralization in metal finishing waste treatment processing are inert, non-toxic, and can be used for land fill or can be discharged on a community dump if they are haulable. Incineration or burning is a very expensive way to drive out the water or sludge. With reference to dry sludge that is haulable, I have found that for disposal, a sludge with a dry weight of 10 to 50% range is satisfactory. Dry weight is the weight that remains after complete drying at 100° C.

Evaluating the problem presented by the inherent pore clogging nature of precipitates or sludges, or ordinarily processed on a filtration bed, I discovered that all of the factors involved could be met to separate out, dry or de-water sludge in an expeditious and inexpensive manner by an entirely different approach to the method of water removal. That is, I have found that the liquid or water content of a used treatment solution can be efficiently and inexpensively removed to produce a haulable or handleable sludge on a sludge bed, if the liquid is removed through or from the side of the container and above the sludge bed. I have been astonished at the ease of de-watering metal precipitates or compounds by, in effect, moving the water sidewise, transversely, radially or outwardly-upwardly out from the sludge instead of trying to move it down through the sludge bed in accordance with conventional practice.

It has thus been an object of my invention to find a solution to the problem of expeditiously, effectively and inexpensively removing sludge or precipitates from used metal processing or treating solutions.

Another object has been to devise an apparatus arrangement and procedure for removing the liquid or water content of a waste solution, without clogging the pores of the path of removal, and in such a manner as to leave the sludge in a settled and undisturbed position or level;

A further object of my invention has been to clarify a used treating or process solution containing metal precipitates by removing the liquid or water content thereof through porous side walls or side wall portions of a container and in such a manner as to avoid clogging pores or interstices;

A still further object of my invention has been to make possible the capillary seepage of moisture of a used treating solution from a container in such a manner as to effectively and inexpensively de-water and collect the precipitates as a sludge of materially lessened moisture content and further, in such a manner, as to provide a progressive self-cleaning action with reference to porous portions through which the liquid moves and as the liquid level in the container lowers;

These and other objects of my invention will appear to those skilled in the art from the following description thereof and the illustrated drawings.

In the drawings,

FIGURE 1 is a top plan view of an installation or apparatus arrangement employing the principles of my invention, and involving the use of a substantially horizontally-extending settling bed, an enclosing vertical or side wall about and for cooperating with the bed to define a receiving container for the solution, and a surrounding moat or receiving area for the liquid or moisture that is removed from the container through its side walls;

FIGURE 2 is a side section in elevation on the scale of and through the bed of FIGURE 1; it is partially broken-away down to show the wall structure;

Figure 3:
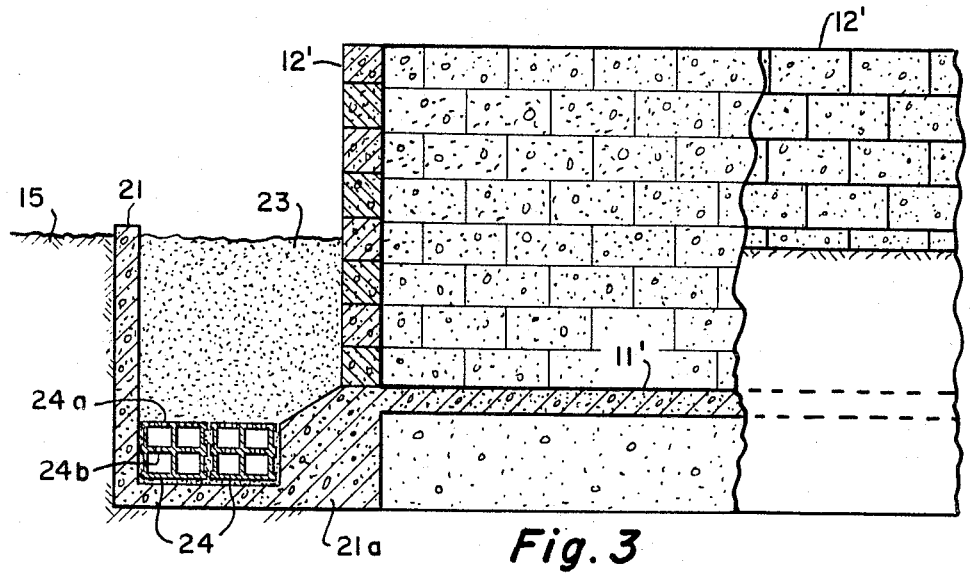
FIGURE 3 is an enlarged fragmental side-elevation illustrating a modified apparatus arrangement which is of a more sophisticated nature employing the principles of my invention.

Briefly, in carrying out my invention, I provide a substantially horizontal or planar settling bed which is of an impervious or non-permeable base construction. This base construction may be, for example, of reinforced concrete, preferably having a smooth upper surface, in order that de-watered sludge collected thereon may be easily scooped or shoveled-out therefrom. I also provide a wall which surrounds or encloses the bed and which extends vertically-upwardly therefrom; it is of porous or permeable construction or at least has porous portions. The side wall and the base parts define an enclosure which is open at the top to receive waste solutions and for ready removal of sludge. I provide a receiving area or moat about the outer periphery of the side wall which extends below the level of the bed and which is sealed-off therefrom. This area or moat serves to receive and collect water or liquid that passes outwardly or seeps through the pores or interstices of the side wall and to direct such moisture downwardly from the outer periphery of the side wall, in order that the side wall may progressively dry out vertically-downwardly as the solution in the container lowers by reason of the movement of the liquid outwardly therefrom. The liquid is collected in the bottom of the moat and the moat is provided with drainage means, such as conduit, tile or the like that is preferably sloped towards a discharge outlet. Thus, the liquid may flow by gravity to the discharge outlet for conducting it to a suitable disposal point.

I have found that even if very slight slurries are present in the solution that the porous vertical wall will perform an excellent de-watering function. First, the sludge is permitted to settle on the bed as a sludge layer with the clarified liquid superimposed thereabove. The clarified liquid is thus in contact with the porous side wall through which it will travel sideways upwardly and outwardly and will discharge into an underpositioned drain collector. As the sludge is settled, more and more of the clarified liquid will seep through the wall filter.

The sludge discharge to the sludge bed is usually an intermittent operation, occurring normally only once a week or less but not more often than once in about 8 hours. My system thus allows the vertical filter wall to be exposed to the air and dried-down to the sludge level, well before the time for receiving a new solution to be treated. When the wall is bare, the precipitated salt particles that may have some tendency to clog wall surface pores are exposed to the atmosphere and dry out. Since there is nothing to hold them on the area, they fall down to provide a self-cleaning action for the peripheries of the wall surface. Since such particles are relatively small, in the nature of dust, even slight air motion, wind or rain water will wash the surface clean.

By providing an underpositioned drain along the outside periphery of the vertical side wall, I insure that the wall is permitted to dry above the sludge level on the bed. Also, by utilizing the side wall, I provide a large, dry, capillary surface exposed to the liquid in the container which will, in effect, be siphoned up and out more than drained down therethrough. By going contrary to the accepted technique of bottom filtration and using only vertical or side wall surfaces for filtering the liquid, I enable an effective self-cleaning action without having to resort to backwashing, mechanical scrubbing of the surfaces, or unplugging the pores by air back pressure.

In the illustrated embodiment of my invention shown in FIGURES 1 and 2, I have provided a sludge separating-out and collecting apparatus or lay-out 10 which has a settling bed, base or bottom part 11 and a surrounding vertical side wall 12 that define an enclosure or container for the waste solution about the bottom part. By way of example, the settling bed, bottom or base part 11 may be of reinforced concrete construction, so that it is impervious to the passage of water or liquids, and the side wall 12 may be constructed of solid cinder block cemented or grouted in place on a reinforced concrete footer 13 and with respect to the outer edges of the bed 11. As shown in FIGURE 2, the container or enclosure for the waste solution will preferably have its bed 11 located near the frost line 16 of the ground level 15, assuming that is an outside installation.

A moat or receiving area is provided about the outer periphery of the side wall 12 and may be in the form of a lagoon defined by a dug-out trench 17 within the ground. The moat extends upwardly along the side wall, above an anticipated maximum sludge precipitate level $b$ on the bed 11 and may, as shown, be filled with a filter aggregate or mass 18, such as of gravel. A drain 19 is shown made up of standard vitrified drain tile sections which are sloped from the left-hand side of the lay-out towards a right-hand or corner discharge outlet 20 for gravity movement of the liquid that is moved downwardly through the gravel 18 and introduced into the tile 19. As shown also in FIGURES 1 and 2, the drain tile 19 is provided with spaced-apart openings 19a through its upper peripheral portion for collecting the water or liquid, but is closed-off adjacent at least its lower half to provide a flow channel for the liquid which is introduced thereto.

Figure 4:
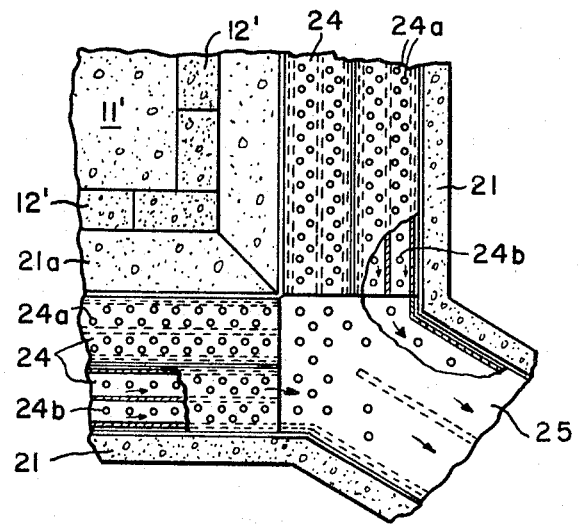
FIGURE 4 is a fragmental plan view of the apparatus of FIGURE 3.
Figure 5:
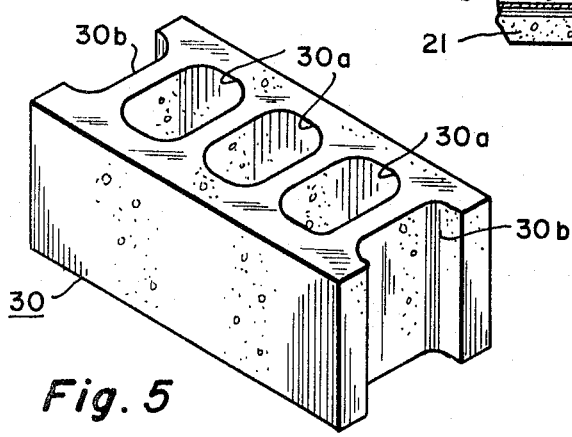
FIGURE 5 is a greatly enlarged perspective view in elevation illustrating a type of wall block that is shown used for the side walls of the apparatus of FIGURES 3 and 4.

In the embodiment of FIGURES 3 and 4, I have shown a container or enclosure as defined by a reinforced concrete bed or base part 11' and by a surrounding vertical side wall 12'. In this illustrated embodiment, the side wall 12' is shown made up of somewhat porous commercial concrete blocks as of the type disclosed in FIGURE 5 which are cemented or grouted in position. As shown in FIGURE 5, central openings 30a in each block 30 and end openings 30b contribute to the passage of liquid therethrough and also contribute to a quick drying of the side wall as the level of liquid in the container is lowered.

In the embodiment of FIGURE 3, the side moat, walled trench, or receiving area about the enclosure or container is provided by extending the reinforced concrete. The extension includes a continuous footer portion 21a for reinforcing the support of the side wall 12', and an angle-shaped combined base and outer vertical wall part 21. It will be noted that the moat projects downwardly, as in the case of the embodiment of FIGURE 2, below the ground level 15, and the bed 11' is positioned near or below the first level. In the embodiment of FIGURES 3 and 4, however, I employ a sand fill 23 and glazed rectangular drain tile 24. It will be noted that the drain tile 24 is of reinforced construction and is provided in the form of pairs that extend along the bottom of the moat for collecting the solution introduced thereto and for delivering it to a discharge outlet conduit or tile member 25, see FIGURE 4. As shown particularly in FIGURE 3, the upper wall of each drain tile 24 has a group of openings 24a therethrough for receiving the liquid and a lesser number of openings 24b through its center partition member, so that the lower portion of each tile 24 serves as a drain conduit.

Although for the purpose of illustrating my invention I have shown representative embodiments thereof, it will be apparent to those skilled in the art that various changes and modifications may be made without departing from the spirit and scope of my invention as herein disclosed.

What I claim is:

1. A method of separating out and collecting the precipitate sludge content of a metal treating liquid waste solution which comprises, providing a container with a sludge bed and a porous side wall enclosure for the bed, introducing the solution into the container, settling the sludge content of the solution as a layer on the bed and clarifying the liquid of the solution above the sludge layer, and drying the sludge on the bed by moving the liquid content of the solution under capillary action and seeping it sideways-outwardly through pores of the porous side wall above the bed.

2. A method as defined in claim 1 wherein, the liquid moving outwardly through the side wall is then moved through a filtering aggregate below the side wall.

3. A method as defined in claim 1 wherein, a liquid receiving area is provided below the side wall and in a sealed-off relation with respect to the bed about the outer periphery of the side wall, and the sideways-outwardly moving liquid is collected in the receiving area in a segregated relation with respect to the sludge layer in the container.

4. A method as defined in claim 1 wherein, the liquid above the sludge level on the bed is seeped radially-outwardly from the container and is discharged from the outer periphery of the side wall, and precipitate particles in the liquid are, after the passage of the liquid through the side wall, dried thereon and removed therefrom.

5. A method as defined in claim 1 wherein, the sideways-outwardly moving liquid, after passage through the porous side wall, is moved downwardly along its outer periphery through a porous aggregate to a receiving area, the liquid in the receiving area is collected adjacent a bottom portion thereof and is then drained therefrom.

6. A method as defined in claim 1 wherein, the sideways-outwardly moving liquid, after passage through the porous side wall, is moved downwardly and filtered within a surrounding outer receiving area, and the liquid is then moved along adjacent the bottom of the receiving area and below the bed to a disposal outlet.

7. A method as defined in claim 6 wherein, the liquid is moved by gravity along the receiving area to the disposal outlet.

8. A method of de-watering precipitates in the nature of metal hydroxides and carbonates contained in a metal treating solution which comprises, introducing the solution into an enclosure having a horizontally extending sludge bed and a side wall about the bed, settling the precipitates on the bed and clarifying the content of the solution above the bed, and drying the precipitates on the bed by moving the clarified solution content under capillary action outwardly through the side wall from the enclosure while retaining the precipitates on the bed.

9. A method as defined in claim 8 wherein, the solution is restricted from moving downwardly through the bed during the drying of the precipitates thereon, a solution receiving area is positioned about the outer side of the side wall below and in a sealed-off relation with respect to the bed, and the outwardly moving solution is collected in the receiving area below the bed.

10. Apparatus for separating out and collecting precipitates contained in a metal treating liquid waste solution which comprises, a horizontally extending bed for receiving and settling the precipitates thereon, a vertically-extending side wall projecting upwardly therefrom and enclosing said bed to define a container for receiving the waste solution therein, a liquid-collecting moat about said side wall and extending below and in a sealed-off relation with respect to said bed, said side wall having a capillary pore construction to move the liquid of the waste solution by seeping the liquid outwardly through the side wall pores by capillary action above said bed and discharge said liquid downwardly below the precipitate level on said bed into said moat to provide dried precipitates on said bed.

11. Apparatus as defined in claim 10 wherein, said side wall is of capillary pore construction along its full vertical extent from said bed to substantially fully remove liquid from the container radially-outwardly therefrom while retaining precipitates on said bed, and said capillary pore construction being progressively self-cleaning on drying out as the liquid level in the container lowers during the passage of the solution therethrough.

12. Apparatus as defined in claim 10 wherein, said bed is impervious to the liquid of the solution, and said moat is provided with filter material therein for filtering the solution as it moves downwardly within said moat.

13. Apparatus as defined in claim 12 wherein, said moat has a discharge outlet, a drain conduit is positioned adjacent the bottom of said moat and extends therealong in a sloped relation towards said discharge outlet to collect the filtered solution therein and move it by gravity to said discharge outlet.

14. Apparatus for separating out and collecting precipitates contained in a metal treating liquid waste solution which comprises, a horizontally-extending liquid-impervious bed, a vertically-extending side wall projecting upwardly from the bed and thereabout to define a container for receiving the waste solution therein, said bed being substantially impervious to the passage of liquid therethrough and having a relatively smooth surface for receiving and settling the precipitates thereon, so that they can be readily removed therefrom, a liquid collecting moat about the outer periphery of said side wall and extending below said bed, said side wall being constructed of a plurality of blocks, said blocks having capillary pores for sideways-outward movement by capillary action of clarified liquid therethrough from the inside of a container above the precipitate level on said bed, said moat having a pervious filter-like aggregate positioned therein to receive and by-pass liquid from said side wall downwardly therewithin, and drain means extending along the bottom of said moat and having open passageways through top portions thereof to receive the liquid from said aggregate and conduct it outwardly from said moat.

15. Apparatus as defined in claim 14 wherein said bed is of relatively impervious concrete construction.

16. Apparatus as defined in claim 14 wherein, said drain means is of tile construction, the tile construction has open positions along its upper surface area to receive the liquid from said aggregate, and the tile structure has a closed wall along its lower surface area to conduct the liquid thus-received.

References Cited
UNITED STATES PATENTS

| | | | |
|---|---|---|---|
| 510,666 | 12/1893 | Zieglers et al. | 210—266 X |
| 3,216,569 | 11/1965 | Crundall | 210—73 |

FOREIGN PATENTS

| | | |
|---|---|---|
| 1,364,730 | 5/1964 | France. |

REUBEN FRIEDMAN, *Primary Examiner.*

D. M. RIESS, *Assistant Examiner.*